United States Patent [19]
Lindsey

[11] Patent Number: 5,983,514
[45] Date of Patent: *Nov. 16, 1999

[54] TAPE MEASURE WITH MANUAL ENTRY ELECTRONIC MEASUREMENT RECORDING FEATURE

[75] Inventor: Warren Mack Lindsey, Seattle, Wash.

[73] Assignee: Measureminder, L.L.C., Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,346

[22] Filed: Apr. 28, 1997

[51] Int. Cl.⁶ .................................................. G01B 3/10
[52] U.S. Cl. .............................................. 33/760; 33/761
[58] Field of Search ........................... 33/755, 759, 760, 33/761, 762, 763, 768, 769, 770

[56] References Cited

U.S. PATENT DOCUMENTS

| | | | |
|---|---|---|---|
| 4,181,848 | 1/1980 | Iwase | 33/763 |
| 4,181,959 | 1/1980 | Tateishi | 33/760 |
| 4,181,960 | 1/1980 | Tateishi et al. | 33/760 |
| 4,195,348 | 3/1980 | Kakutani | 33/763 |
| 4,242,574 | 12/1980 | Grant | 33/763 |
| 4,551,847 | 11/1985 | Caldwell | 33/755 |
| 4,587,738 | 5/1986 | Kang | 33/762 |
| 4,642,899 | 2/1987 | Fass et al. | 33/760 |
| 4,882,850 | 11/1989 | Lindsey | 33/760 |
| 5,142,793 | 9/1992 | Crane | 33/763 |
| 5,230,159 | 7/1993 | Lipsey | 33/770 |
| 5,396,578 | 3/1995 | Howes | 33/760 |
| 5,426,863 | 6/1995 | Biggel | 33/763 |
| 5,433,014 | 7/1995 | Falk et al. | 33/760 |

*Primary Examiner*—G. Bradley Bennett
*Attorney, Agent, or Firm*—Christensen O'Connor Johnson and Kindness PLLC

[57] ABSTRACT

A tape measure (10) including an electronic keypad (20) and display (24) for recording and viewing measurements is disclosed. The keypad includes up (44) and down (46) buttons, save (48) and recall (50) buttons, a set button (46) and a clear/on button (40). The up and down buttons are used to selectively increment and decrement numeric values representing units of measurements, which are displayed on the display. Measurements are entered and displayed in feet, inches, and sixteenths of an inch in the English system, or in metric units. After manually measuring a distance using a coiled measuring tape, a user presses the up and down buttons to specify the distance measured, then presses the save button to store the measurements. The recall button is used to recall previously stored measurements.

11 Claims, 3 Drawing Sheets

TAPE MEASURE WITH MANUAL ENTRY ELECTRONIC MEASUREMENT RECORDING FEATURE

FIELD OF THE INVENTION

The present invention relates generally to flexible tape measures, and more particularly, to a tape measure having means for recording measurements.

BACKGROUND OF THE INVENTION

Carpenters frequently take measurements with a tape measure, recording the measurements with a pencil on scraps of paper, lumber, or any convenient surface. Recorded measurements may be misplaced, covered up, illegible, or left in an inconvenient location. Carpenters may have difficulty recording the measurements. For example, the pencil may break or be lost, or the carpenter may be wearing heavy gloves that make writing difficult.

It is desirable to have a self-contained measurement recording device that is an integral part of the tape measure and does not require a separate recording instrument, such as a pencil. It is also desirable that the recording device be easy to use, preferably with one hand, even when the carpenter is wearing heavy gloves.

SUMMARY OF THE INVENTION

The present invention provides a tape measure for measuring distances and including an electronic mechanism for recording the resultant measurements. A tape measure having a conventional spiral-wrapped, flexible, metal measuring tape coiled within a housing includes a display and a keypad on the side of the housing for entering and viewing measurements taken with the tape. After using the extendible tape to measure distance, a user enters the measurements by using the keypad on the side of the tape measure. Numeric values are entered using "up" and "down" keys that increment and decrement the numeric values, which appear on a display. "Save" and "recall" buttons are used to save measurements and recall them. A measurement can consist of multiple fields, each field corresponding to a unit of measurement, such as feet, inches, and sixteenths of an inch. When entering a measurement, a "set" button is used to move between numeric fields. The measurement is viewed on an LCD-type display, and can be in either English units or metric units.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
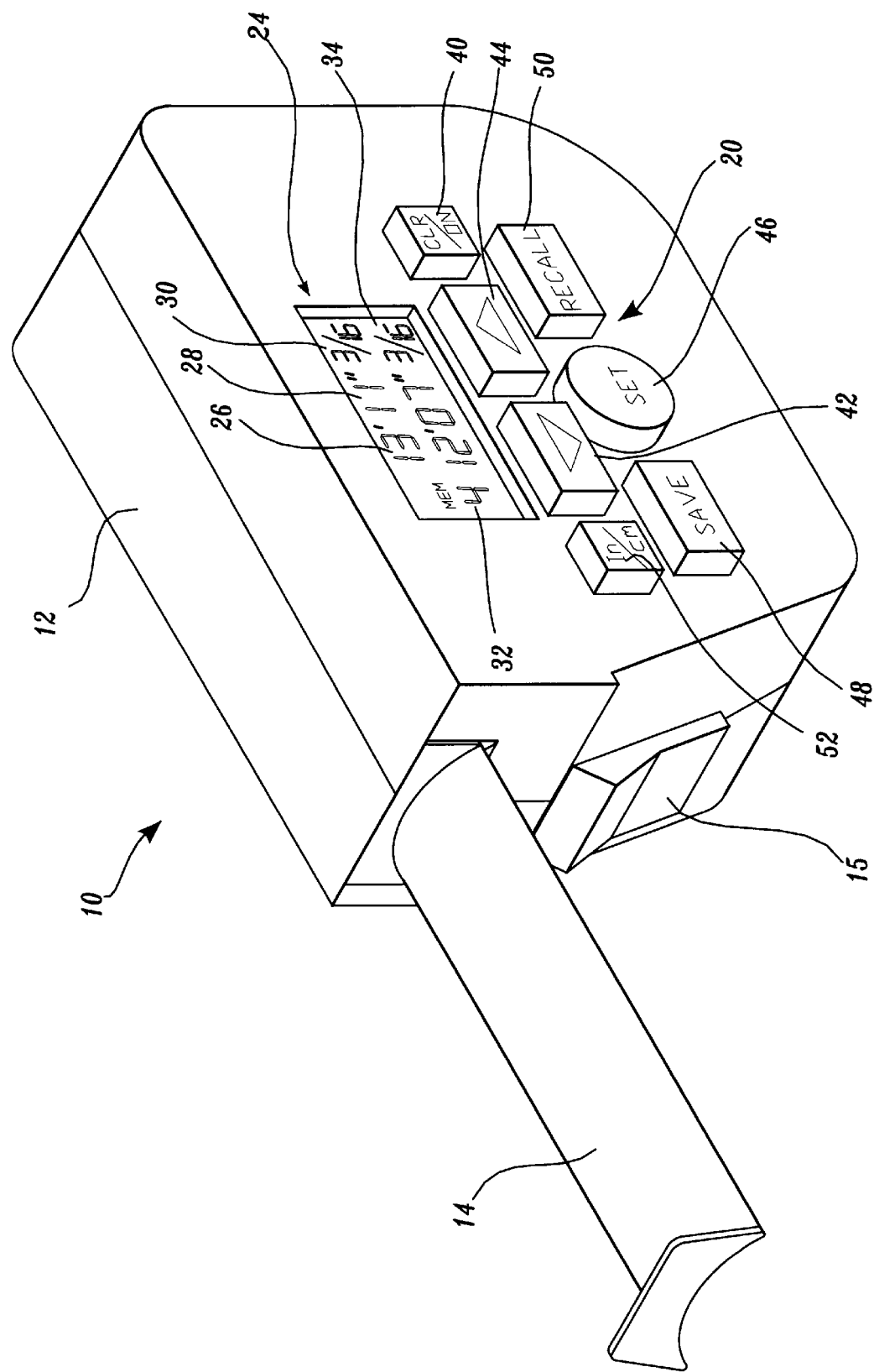
FIGS. 1A–B are a perspective view and a side elevation view of a tape measure having an electronic recording device in accordance with the invention.

FIG. 1A illustrates a tape measure 10 in accordance with the present invention. The tape measure includes a conventional spiral wrapped, flexible metal measuring tape 14 coiled within a housing 12. A spring-loaded reel (not shown) automatically retracts the flexible measuring tape 14 into the housing 12. A lock 15 mounted on the front of the housing selectively locks the flexible metal measuring tape 14 in an extended position relative to the housing 12.

The flexible measuring tape 14 includes a human readable scale (not shown) along both edges thereof The human readable scales are in English units and in metric units. Preferably, the English units in the tape indicate feet, inches, and sixteenths of an inch. The housing includes a keypad 20 preferably located on one side of the housing 12. The keypad 20 allows a user to manually enter a measurement obtained by using the measuring tape 14. A display 24 mounted on the housing displays the measurement as it is manually entered on the keypad 20. In the preferred embodiment, the display 24 is a liquid crystal display, but other electronic displays, such as a light emitting diode display, may be suitably used.

The display 24 depicted in FIG. 1A illustrates a measurement shown in English units. A measurement comprises a plurality of numeric fields, each field corresponding to a unit of measurement. Preferably, the measurement within the display 24 includes a foot units field 26, and an inch units field 28, and a sixteenths of an inch unit field 30. These three fields show the number of feet, the number of inches, and the number of sixteenths of an inch, respectively, in the corresponding measurement.

As depicted in FIG. 1A, the display 24 also includes a index value field 32 that indicates an index value corresponding to a current memory location, and a retrieved measurement field 34 that is used to display measurements retrieved from memory. The use of these fields, is described in further detail below.

A user manually records a measurement using the keypad 20. The buttons that comprise the keypad are large, and preferably sized to allow a user to enter data while wearing gloves, such that buttons may still be discretely and individually depressed with accuracy. A "clear/on" button 40 turns on the power to the display. When the clear/on button 40 is depressed, all of the fields that comprise the displayed measurement are set to zeros, and the left-most numeric field blinks to indicate that this field has the "focus." The numeric field that has the focus is the field that is modified when a user presses the "down" button 42 or the "up" button 44. In one actual embodiment, depressing the clear/on button 40 for five seconds causes all of the stored measurements, as well as the displayed measurements, to be set to zeros.

When the down button 42 is depressed, the numeric value in the measurement field having the focus is decremented. When the up button 44 is depressed, the numeric value in the measurement field having the focus is incremented. To reach a desired value in the field having the focus, a user presses the up button and down button until the correct value is obtained. Once the desired value is reached, the "set" button 46 is depressed. This changes the focus to the next numeric field. The down and up buttons are then used in the same manner to obtain the desired value in this numeric field. Once the desired value is obtained in this field, the set button is again depressed, changing the focus to the next numeric field. The up and down buttons are again selectively depressed in the same manner as described above, to obtain the desired value for the current numeric field.

A user recording a measurement uses the up button 44 and down button 42 to set the number of feet in a measurement, and presses the set button 46 when the correct numeric value is reached. The user then presses the up and down buttons until the correct numeric value for the number of inches is obtained, then presses the set button 46 again. The user then presses the up and down buttons to obtain the correct value for the number of sixteenths of an inch, and once again presses the set button.

Once the desired values are obtained in the display for all unit fields, the user presses the save button 48, which stores the settings in one of a plurality of memory locations that are used to store measurements. The user may then follow the same process described above to enter a new measurement and save the new measurement. If desired, the clear/on button 40 may be used to reset the numeric values of the current measurement, as displayed in the fields 26, 28, and 30, to zeros. Alternatively, it may be desirable to begin with the previously saved measurement, and use the up and down buttons to modify this measurement for storage. When the save button 48 is pressed, the focus is set to the left-most numeric field in the measurement.

A predetermined number of memory locations are used to store measurements. Each memory location has a corresponding index value. The "current index value" is displayed in the index value field 32. When the save button 48 is pressed, a measurement is stored in the memory location corresponding to the current index value, and the current index value is incremented. If the save button is pressed again, the new measurement is saved in the new memory location corresponding to the new current index value. When the current index value is equal to the maximum number of memory locations used to store measurements, pressing the save button will cause the index value to be set to one. Saving a new measurement erases the measurement saved in the memory location corresponding to the current index value and stores the new measurement in its place.

The recall button 50 is used to read previously saved measurements. When the recall button 50 is pressed, the current index value, as displayed in the index value field 32, is incremented, and the measurement previously saved in the memory location corresponding to the new index value is retrieved and displayed in the retrieved measurement field 34.

As depicted in FIG. 1A, the buttons on the keypad 20 are distinct mechanical buttons. As should be readily apparent to one skilled in this art, and others, different mechanisms and technologies may be used to implement the buttons on the keypad 20. For example, two or more buttons may comprise distinct areas on a single control, such that each distinct area on the control is a button. Pressing a distinct area on such a control causes a signal to be sent to the processor, wherein distinct areas have corresponding distinct signals. Additional mechanisms for creating buttons on a keypad are also well known in the art.

Figure 1B:
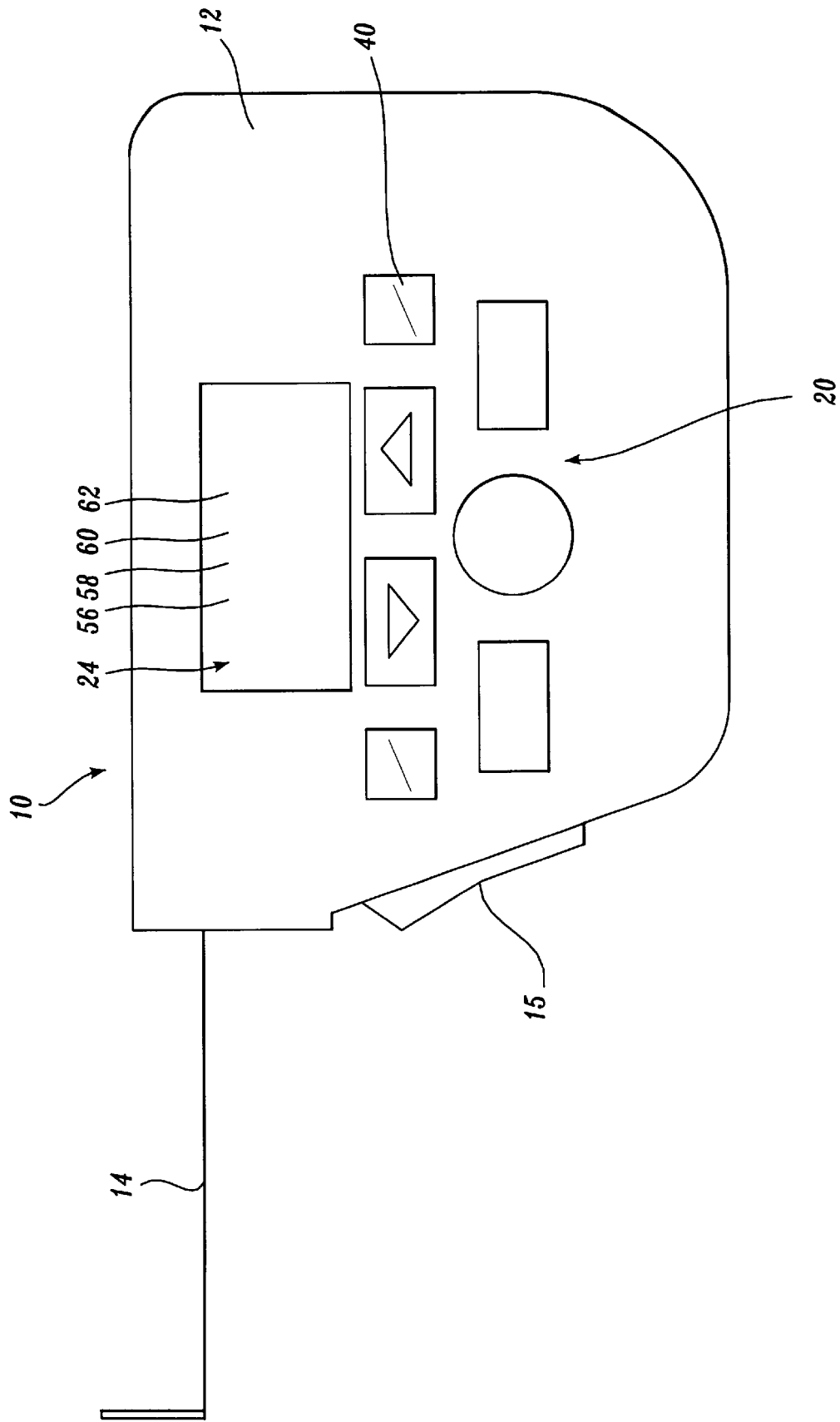

An "inch/centimeter" button 52 toggles the display 24 between English units of measurements and metric units. FIG. 1B illustrates a tape measure 10 in accordance with the present invention, having a display 24 that shows a measurement in metric units. Preferably, when displaying metric units, each digit of the measurement makes up one numeric field. The keypad and display function similarly to that described above pertaining to English units. As depicted in FIG. 1B, the measurement comprises four numeric fields 56, 58, 60, and 62 indicating meters, decimeters, centimeters, and millimeters, respectively.

Figure 2:
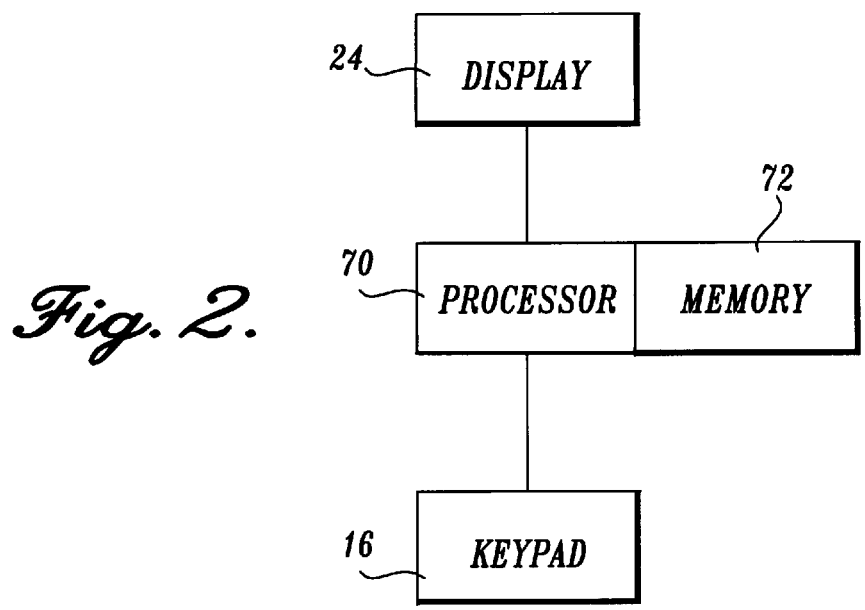
FIG. 2 is a block diagram illustrating the input and output components of the invention.

FIG. 2 illustrates the components that comprise the electronic storage mechanism of the present invention. The keypad 20 is electronically connected to, and provides input to, a processor 70. The processor 70 has an associated memory 72 that can be contained within the processor. The processor 70 controls the contents of the display 24, as described above. The device also includes logic circuitry and a battery power supply (both not shown).

Figure 3:
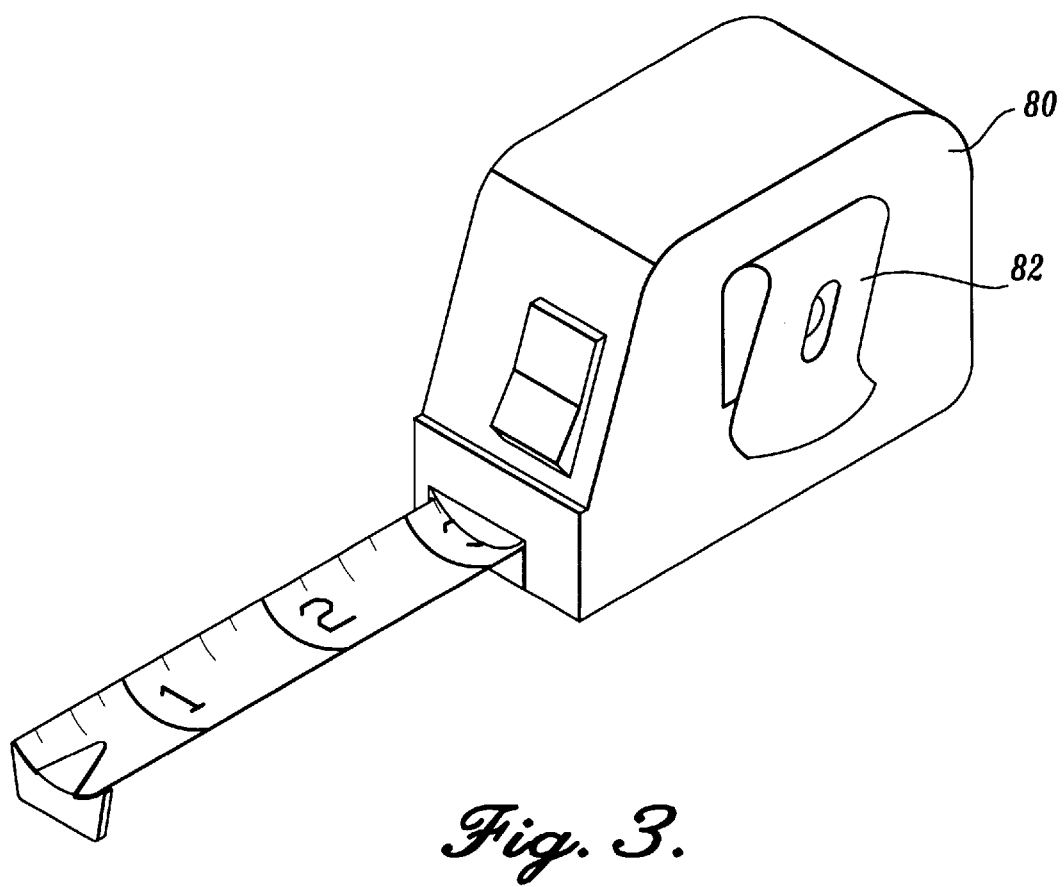
FIG. 3 is a perspective view of the tape measure depicted in FIG. 1A, showing the reverse side.

FIG. 3 illustrates the tape measure's reverse side 80. A belt clip 82 allows the tape measure to be attached to a user's belt or pocket. As depicted, the belt clip 82 is positioned to allow the use of the keypad 20 and viewing of the display 24 while the tape measure 10 is clipped to a user's belt.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A distance measuring and recording device comprising:
    a housing; an extendible and retractable flexible tape contained within the housing for manually measuring a linear dimension;
    a display connected to the housing and having at least one numeric field contained therein; and
    at least one manually activatable entry button for manually and successively depressing to record the measured dimension by incrementing or decrementing a numeric value contained in the numeric field through a series of uniformly stepped numbers until the measured dimension has been reached.

2. The device of claim 1, wherein the at least one manually activatable entry button comprises up and down buttons for incrementing and decrementing, respectively, the numeric value contained in the numeric field.

3. The device of claim 1, further comprising:
    a save button for storing the numeric value contained in the numeric field; and
    a recall button for displaying a previously stored numeric value.

4. The device of claim 1, wherein the display includes a plurality of numeric fields, and wherein the device further includes a set button for modifying the numeric field that is incremented or decremented by the manually activatable entry button.

5. The device of claim 4, wherein the display includes at least three distinct numeric fields, each numeric field corresponding to a distinct unit of measurement.

6. The device of claim 5, wherein the display includes a first numeric field indicative of the number of feet in a measurement; second field indicative of the number of inches in a measurement, and a third field indicative of the number of fractional parts of an inch in a measurement.

7. The device of claim 6, further comprising a toggle button for toggling the device between an English system of measurement and a metric system of measurement.

8. The device of claim 7, wherein the keypad includes keys that are sized to discretely receive a person's gloved finger.

9. A method of measuring a distance and recording the resultant measurements, comprising:
    (a) providing a measuring tape having a housing including a keypad and display, the keypad including at least one manually activatable numeric increment or decrement button the display including at least one numeric field indicative of a measurement;
    (b) extending the measuring tape across a distance to be measured;
    (c) using the measuring tape to manually obtain a measurement; and (d) manually and successively pressing the numeric increment or decrement button to record the desired measurement by modifying a numeric value contained in the numeric field of the display through a series of uniformly stepped numbers until the desired measurements have been reached.

10. The method of claim 9, wherein the keypad includes a save button and a recall button, the method further comprising:

pressing the save button to store the numeric value currently displayed within the display; and pressing the recall button to retrieve a previously stored value.

11. The method of claim 10, wherein the display includes a plurality of numeric fields, and wherein the keypad includes a set button, the method further comprising:

pressing the set button to change the numeric field that is controlled by the numeric increment or decrement button.

* * * * *

UNITED STATES PATENT AND TRADEMARK OFFICE
CERTIFICATE OF CORRECTION

PATENT NO. : 5,983,514
DATED : November 16, 1999
INVENTOR(S) : W.M. Lindsey

It is certified that error appears in the above-identified patent and that said Letters Patent is hereby corrected as shown below:

COLUMN  LINE 4      17      After "a housing;"
(Claim 1, line 2)      begin a new paragraph with "an extendible and retractable . . ."

Signed and Sealed this

Twenty-eighth Day of November, 2000

Attest:

Q. TODD DICKINSON

*Attesting Officer*      *Director of Patents and Trademarks*